United States Patent [19]
Davidson et al.

[11] 3,722,401
[45] Mar. 27, 1973

[54] APPARATUS FOR PROCESSING EDIBLE FOODSTUFFS

[75] Inventors: Arthur R. Davidson, Lake Oswego, Oreg.; John E. Haubner, Vancouver; George A. White, Quincy, both of Wash.

[73] Assignee: Lamb-Weston, Inc., Portland, Oreg.

[22] Filed: Sept. 13, 1971

[21] Appl. No.: 180,046

Related U.S. Application Data

[62] Division of Ser. No. 730,087, May 17, 1968, Pat. No. 3,642,495.

[52] U.S. Cl. ..................99/407, 15/3.2, 134/105
[51] Int. Cl. ................................................A47j 37/12
[58] Field of Search........99/407, 404, 405, 406, 409, 99/348; 259/9, 10; 15/3.2; 134/105

[56] References Cited

UNITED STATES PATENTS

| | | | |
|---|---|---|---|
| 2,299,080 | 10/1942 | DeBack | 99/404 X |
| 2,018,419 | 10/1935 | Richeson | 99/404 X |
| 3,086,444 | 4/1963 | DeBack | 99/404 X |
| 2,732,789 | 1/1956 | Herberg | 99/404 |
| 2,643,603 | 6/1953 | Balluteen | 99/404 |
| 3,505,085 | 4/1970 | Straughn et al. | 259/9 X |
| 959,448 | 5/1910 | Baxter | 99/348 X |
| 1,307,508 | 6/1919 | Meakin et al. | 99/348 X |
| 1,922,035 | 8/1933 | Goodman | 99/405 X |
| 754,278 | 3/1904 | Betz et al. | 99/406 |
| 3,616,747 | 11/1971 | Lapeyre | 99/407 X |

FOREIGN PATENTS OR APPLICATIONS

| | | | |
|---|---|---|---|
| 837,428 | 6/1960 | Great Britain | 259/9 |

Primary Examiner—Leon G. Machlin
Attorney—Buckhorn, Blore, Klarquist & Sparkman

[57] ABSTRACT

An apparatus for processing edible foodstuffs having a cylindrical casing and a screw conveyor coaxially disposed within the casing for transporting a food product from one end to a point adjacent the other. A vertical discharge flue is positioned adjacent the discharge end of the casing and is in communication with an opening at the bottom thereof. Heat-exchanging liquid is introduced into the casing through orifices in the bottom to heat or cool the product, as the case may be, and in an amount sufficient to fill the casing to a level above that of the screw conveyor. The liquid entrains the product at a point adjacent the discharge end of the casing causing it to flow through the bottom opening thereof and vertically up through the discharge flue from which it passes over a weir at the top thereof at a level substantially equal to the elevation of the liquid in the casing. The liquid assisted transport thereby achieves elevation of the product without risk of damage thereto.

7 Claims, 8 Drawing Figures

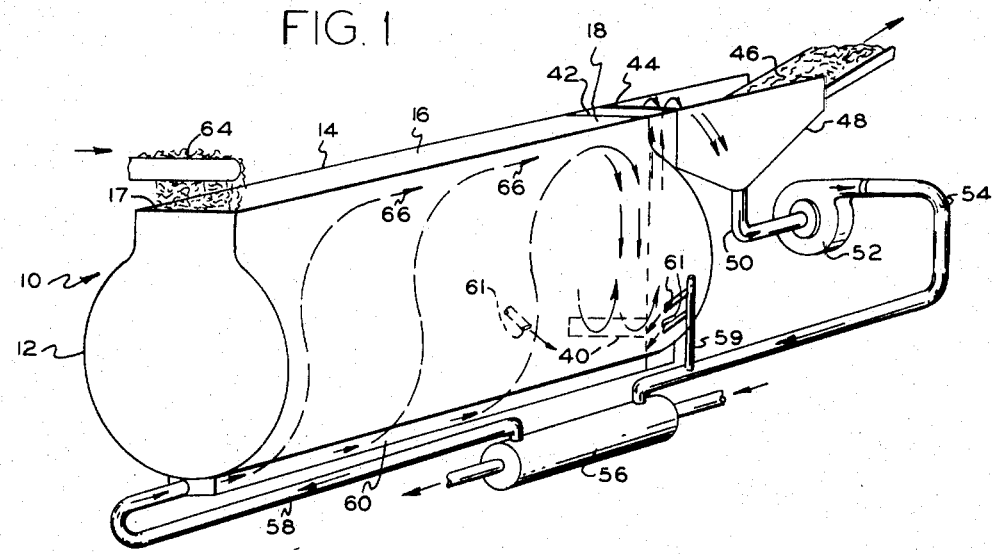
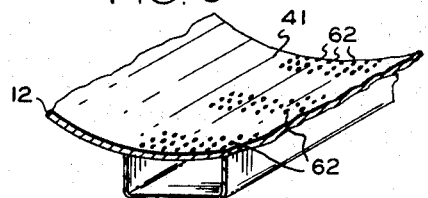
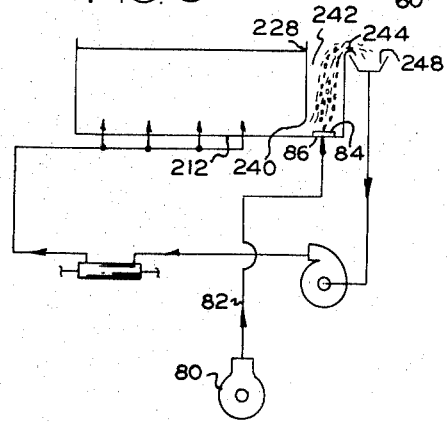
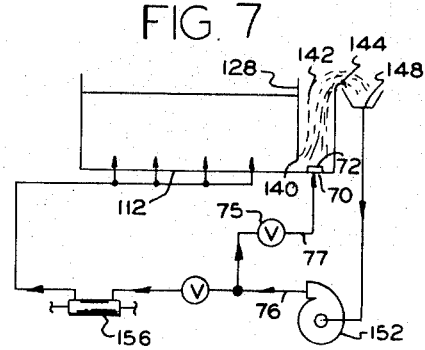

APPARATUS FOR PROCESSING EDIBLE FOODSTUFFS

This is a division of application Ser. No. 730,087, filed May 17, 1968 now U.S. Pat. No. 3,642,495, issued 2/15/72.

BACKGROUND OF THE INVENTION

This invention relates to the processing of edible foodstuffs and, more particularly, to the processing of foodstuffs by exchanging heat with them by means of a liquid thereby either to heat or cool the foodstuffs.

In the past, vegetables and other types of food products have been conveyed through water either to heat or to cool them. Vegetables have thus been cooked or blanched in heat generating apparatus or cooled in cooling apparatus. During such processing, the products have been transported through hot or cold water by various mechanical means such as augers, drag conveyors, flighted mesh conveyors, or revolving perforated cylinders having internal screw flights therein.

These prior art systems, however, have been subject to numerous deficiencies. Specifically the prior art devices cause excessive mechanical abuse to the product, especially during the discharging thereof from the unit. A case in point is the auger or screw type of blancher used for both cooking and cooling of potato pieces in the processing of what are known as shoestring or french cut potatoes. These screw types of blanchers are used where large capacities are required since they can accommodate a large amount of the product in relation to their size. Unloading of these screw types of blanchers is most commonly achieved by a mechanical Ferris wheel arrangement located at the discharge end, by a food pump or by an auger or a flighted conveyor, or the product is simply forced or squeezed out by the action of the screw which pushes the product through the unit. In each of these cases, the mechanical forces involved damage many of the delicate products after they have been heated or cooled to the required degree.

Another defect common to the screw type of blancher is its difficulty in obtaining an even heating or cooling of the product, which is a result of the fact that it is not possible to achieve a good circulation of the heating or cooling medium in the unit. Heating is achieved in the typical unit by means of steam injected at points along the bottom of the cylindrical shell of the blancher. Besides creating mechanical and noise problems, this injection of steam fails to provide a good circulation of heated water throughout the mass of the product and thus does not heat it evenly.

It is thus the primary object of the present invention to provide a new and improved apparatus for processing foodstuffs that will enable whole vegetables, vegetable pieces, or other food products to be blanched, cooked, or cooled in a manner more efficient than that known heretofore.

A further object of the present invention is to provide apparatus for discharging a food product from a screw type of blancher or similar apparatus that will avoid damaging the product.

It is a still further object of the present invention to provide apparatus for processing food products that will discharge such products substantially at the top or slightly above the top of a screw type of blancher or similar cooling apparatus, thereby to make it possible to have a number of such apparatus in series without the necessity of elevating initial processing equipment substantially above the floor.

It is a still further object of the present invention to provide apparatus for processing food products that will enable such products to be discharged from a screw type of blancher or similar cooling apparatus without damage.

It is a still further object of the present invention to provide apparatus for processing food products that will achieve an improved circulation of the heating or cooling medium throughout the apparatus, thereby to achieve a more efficient heat transfer and to provide even and complete heating or cooling of each piece of the product.

It is a still further object of the present invention to provide apparatus for processing food products that will achieve a good circulation of the heating or cooling medium throughout the mass of the product being processed, thereby thoroughly to cleanse or wash the product during the processing thereof.

It is a still further object of the present invention to provide apparatus for processing food products that will require only a single pumping source both to circulate the heating or cooling medium through the product and to elevate the product at its point of discharge from the apparatus.

SUMMARY OF THE INVENTION

The apparatus of the present invention comprises a cylindrical casing and screw means coaxially disposed within the casing for transporting a food product from one end of the casing to a point adjacent the other end thereof. A discharge opening is provided in the bottom of the wall at the discharge end of the casing. Means are provided to introduce a heat exchanging and product transporting liquid into the casing through the bottom. The liquid is introduced at a rate sufficient to maintain the level in the cylindrical casing above that of the screw means.

A vertical discharge flue is provided in communication with the discharge opening through which the liquid entrained product is carried upwardly. Weir means are located at the top of the flue at a level sufficiently below the level of the liquid in the casing to maintain a volume of flow capable of entraining the product and carrying it out of the casing and up through the flue. Means to separate the product from the entraining liquid are provided adjacent the weir, and means to recirculate the liquid are also provided.

If desired, the apparatus may further comprise means to inject a plurality of jets of fluid, either liquid or gas, upwardly into the bottom of the vertical discharge flue to assist in lifting the liquid flowing therethrough over the weir means at the top thereof.

BRIEF DESCRIPTION OF THE DRAWINGS

FIG. 1 is a schematic view of apparatus constructed in accordance with the present invention.

FIG. 6 is a perspective view of a section of the bottom of the casing.

FIG. 7 is a schematic view of apparatus constructed in accordance with a different embodiment of the invention.

FIG. 8 is a schematic view of apparatus constructed in accordance with still another embodiment of the present invention.

DESCRIPTION OF THE PREFERRED EMBODIMENTS

Figure 3:
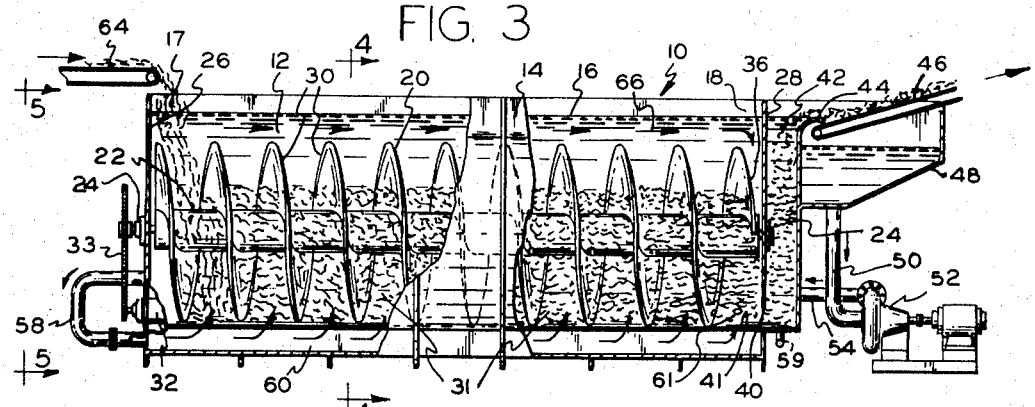
FIG. 3 is a sectional view on line 3—3 of FIG. 2.
Figure 2:
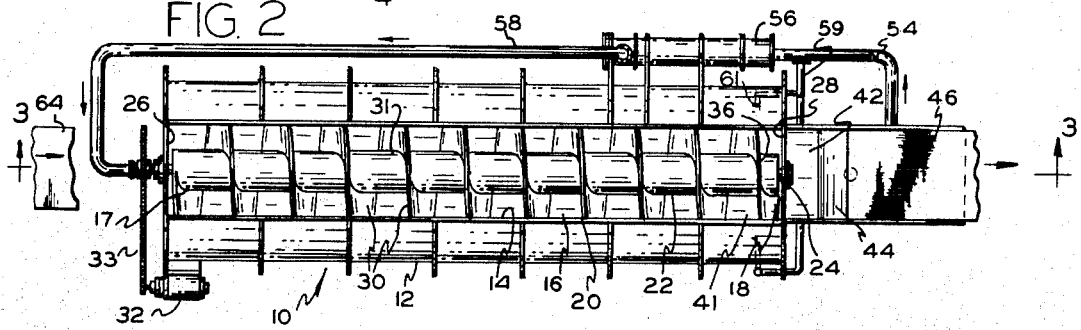
FIG. 2 is a plan view of the apparatus shown in FIG. 1.
Figure 4:
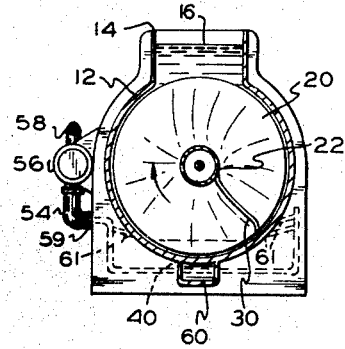
FIG. 4 is a sectional view on line 4—4 of FIG. 3.
Figure 5:
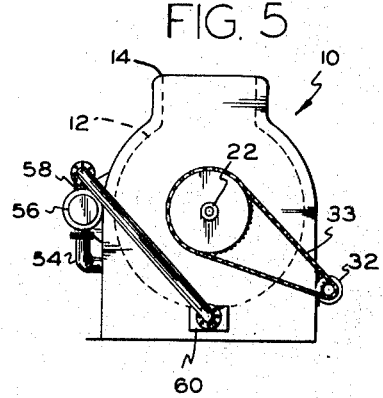
FIG. 5 is a view taken on line 5—5 of FIG. 3.

Referring to the drawings and in particular to FIGS. 1–6, the embodiment of the invention disclosed herein is a screw type of blancher 10 which can be used either to heat or to cool vegetables or other food products in hot or cold water or in other suitable liquids such as aqueous solutions of sugars or salts or in fats or in oils. The Blancher 10 comprises a horizontal cylindrical casing 12 having a diameter smaller than its length and having an open raised section 14 at its top which serves as a flume or channel 16 through which hot water, for example, may flow horizontally from the loading end 17 toward the discharge end 18.

A screw 20 mounted on a shaft 22 supported by bearings 24 mounted in the end walls 26, 28 is positioned in the center of the cylindrical casing 12 and is provided with a helical flight 30 defining, in effect, pockets 31 which hold and transport a food product from one end of the blancher to the other. A motor 32 mounted on the side of the blancher 10 rotates the screw 20 by means of a chain drive 33 to cause the product to progress horizontally from the inlet end to a point 36 adjacent the discharge end 18 of the blancher. A feature of the invention resides in the fact that the screw 20 terminates short of the actual discharge end 18 of the blancher, and the purpose for this construction will become apparent hereafter.

A discharge opening 40 (see FIGS. 1 and 3) is provided in the end wall 28 of the casing starting at the bottom 41, rising vertically a few inches and extending in width a distance approximately equal to the width of the flume 16. A purpose of the opening 40 is to permit passage of the food products from the casing 12 to a vertical discharge flue 42 adjacent the end wall 28. Thus the opening 40 connects the interior of cylindrical casing 12 with the flue 42 to permit the food products to be carried out of the casing and up the flue by the heat-exchanging liquid in a manner to be hereinafter described.

As the product completes its upward passage through the flue 42, it is discharged over a weir or spillway 44 mounted at the top of the flue. The weir 44 is located sufficiently below the level of the liquid in the flume 16 to maintain a volume of flow capable of entraining the product and carrying it out of the casing 12 and the flue 42. Means to separate the product being processed from the liquid are mounted adjacent the weir 44. These means may take the form, as in the illustrated embodiment, of a moving screen 46. A traveling mesh belt or vibrating rod shaker may be used instead of the screen 46 if such be desired.

A sump 48 is mounted adjacent the vertical discharge flue 42 to catch the liquid separated from the product by the screen 46. The sump 48 discharges into a pipe 50 which conducts the liquid into a suitable pump 52 which forces the liquid through a pipe 54, and thence into a heat exchanger 56. A pipe 58 conducts the reheated or recooled liquid into a duct 60 disposed adjacent the bottom 41 of the casing 12. (See FIG. 6.) The heat-exchanging liquid is thus introduced from duct 60 into the casing 12 upwardly through orifices 62, the liquid filling the entire casing 12 and serving to heat or cool the product being transported by the screw 20 therethrough. A line 59 conducts liquid to additional orifices 61 disposed in the bottom of the casing approximately 10 inches inboard from the end wall 28 for a purpose to be described hereafter.

In operation, the apparatus operates essentially as follows. A food product is loaded into the inlet or loading end 17 of the blancher by suitable means such as a continuous belt conveyor 64. The apparatus and its connecting flues and pipes are filled with a heat-exchanging liquid, such as hot water, and the pump 52 is activated to force the water to circulate from the collecting sump 48 at the discharge point through the heat exchanger 56 to the duct 60 located along the bottom 41 of the casing, and thence upwardly through the orifices 62 into the lower portion of the casing. The water in the casing is maintained at a level above that of the tops of the flight 30 on the screw 20. The motor 32 is also activated to rotate the screw 20 and transport the product in the pockets 31 through the casing.

The upward flow of liquid through the unit merges with and forms a horizontal flow 66 in the flume 16 at the top of the casing above the flight 30. The velocity of the liquid through the apparatus, however, is carefully controlled so that the food products are not washed up and out of the pockets 31.

As the horizontally flowing liquid reaches the discharge end 18 of the casing, the flow turns downwardly as shown in FIG. 1, discharging through the opening 40 in the end wall 28. The flight 30 on the screw 20 is cut back or stopped sufficiently clear of the end wall 28 to permit the flow of liquid to proceed freely down and out of the discharge opening 40. The liquid is thus able to entrain the product discharged at point 36 at the end of the screw 20 and carry it downwardly through the discharge opening 40 and then upwardly through the vertical discharge flume 42, thence over the weir 44 and onto the screen 46 where it is separated from the liquid. Jets of liquid discharged from orifices 61 help to push the product towards the opening 40 and keep it in suspension as it passes from the end of the screw 20 to the flue 42.

The liquid is then collected in the sump 48 from where it is pumped through the pipes 50 and 54 by the pump 52. The heat exchanger 56 restores the temperature of the liquid to what it was at the beginning of the operation, and the liquid is then discharged from the duct 60 through the orifices 62 back into the bottom 41 of the casing 12 to continue the operation.

A feature of the invention is that the weir 44 is positioned at the top of the vertical discharge flue 42 at a level substantially equal to the level of the liquid in the flume 16. The pump 52 which serves to recirculate the liquid from the sump 48 and return it to the casing, of course, has to maintain the level of the liquid in the casing slightly higher than the level of the weir 44 to provide the necessary head to create a discharge flow thereover. However, the discharge level of the product is very close to the inlet elevation, which permits a series installation of equipment all at the same or nearly the same base level. This contrasts with prior art equipment which has required elevating each unit with respect to a subsequent unit to permit a discharge from one into the next.

FIG. 7 illustrates a different embodiment of the present invention. A casing 112 has a vertical flue 142 adjacent its discharge end. A header box 70 positioned in the bottom of flue 142 is provided with holes 72 therein for the injection into the bottom of flue 142 of jets of a heat-exchanging liquid supplied from a pump 152 through a valve 75 and pipes 76 and 77. The jets from the header box 70 impart an additional vertical lifting force to the liquid, causing it to elevate and spill over a weir 144 into a collecting sump 148. As this liquid overflows the weir 144, its place is taken by liquid from the casing 112 passing through an opening 140 in the lower end of the end wall 128, thereby setting up a continuous flow from the sump 148 to the pump 152 through a heat exchanger 156 and back to the casing 112 to maintain the desired head and flow.

FIG. 8 discloses still a further embodiment of the present invention. An air compressor 80 provides a flow of compressed air through a pipe 82 and a plurality of orifices 84 in a header 86 in the bottom of a vertical discharge flue 242 adjacent the discharge end of a casing 212, thereby to impart an additional lifting force to the liquid in the flue 242. The force of the compressed air causes the liquid in the flue 242 to rise and overflow a weir 244 at the top thereof. As in the previous embodiment, as the liquid rises and overflows the weir 244 into a sump 248, it is replaced by water flowing from the casing 212 through an opening 240 in the end wall 228 thereof with the water recirculating through the system as previously described.

In the embodiments shown in FIGS. 7 and 8, a discharge of liquid-entrained food product is actually achieved at a level equal to or even higher than the liquid level maintained in the respective casing. Such a result is achieved by means of the lifting forces supplied either by the jets of liquid or compressed air.

Three functions are accomplished by the liquid used in the apparatus of the present invention. The liquid is first of all used to provide a means of heating or cooling the food products. As the product is moved by the screw conveyor 20, it is kept within the blancher for a prescribed period of time during which either a certain amount of heat is imparted to it or withdrawn from it by the liquid. Thus the flighted screw 20 in the casing 12 serves to regulate the length of time that the food product remains in the blancher 10 and the time that it is in contact with the heating or cooling liquid.

The second function of the liquid in the apparatus is to serve as a means of transporting the product from the point 36 where the screw conveyor 20 ceases its action to the screen 46 where the product is actually discharged from the apparatus. Thus, although the screw 20 transports the food products from one end of the casing to the point 36 adjacent the other end thereof, the product from point 36 onward is actually transported by the liquid. The product is entrained by the liquid as the latter flows through the opening 40 in the end wall 28, upwardly through the vertical discharge flue 42, and onto the screen 46 or other separating means. The liquid thus serves both as a heat-exchanger and product-transporter or carrier.

In the embodiments shown in FIGS. 1-6, the point of discharge is at a level substantially equal to or only slightly lower than the level of the water in the flume 16. In the embodiments shown in FIGS. 7 and 8, the point of discharge is actually at a level equal to or even slightly above the water level in the flume 16. The final elevation of the product from the point 36 is thus accomplished without recourse to any mechanical means, thereby to avoid any damage or injury to the pieces.

The third function of the liquid in the apparatus of the present invention is that of washing or rinsing the product as the liquid flows upwardly into the casing 12 through the orifices 62. As the liquid flows upwardly through the orifices 62 in the bottom of the casing 12, it must pass through the product being transported by the screw 20 and this action agitates but does not lift the product and also washes its surfaces. This is especially useful in the processing of potato pieces where it is sometimes desirable to leach or wash away surface sugars.

The circulation of the heating or cooling liquid through the casing 12 by its introduction through the orifices 62 in the bottom thereof also provides good circulation of the heat-exchanging liquid throughout the casing and maintains an even rate of heat transfer to the product, thereby to provide for controlled heating and cooling thereof. The use of the heat exchanger 56 to restore the temperature of the liquid to the initial temperature thus permits indirect heating or cooling of the liquid in the casing in contrast to the usual method, in the case of heating, of using a direct injection of steam into the blancher with its attendant high noise and destructive mechanical vibrating action.

A unit for the processing of cut shoestring potato pieces in preparation for frying was built having a 70 inch diameter cylindrical casing 22 feet long and a 30 inch wide by 18 inch deep open-top flume running the entire length thereof. An auger having a 12 inch diameter shaft and a 69½ inch diameter flight having an 18 inch pitch transports the potato pieces through the casing. A 10 horsepower circulating pump capable of handling 800 gallons per minute is used to circulate hot water through the apparatus. A tubular steam-to-water heat exchanger having 150 square feet of heat-exchanging surface is used to heat the water used. The apparatus retains potato pieces from one to ten or more minutes in hot water from 150° F. to 200° F. and is able to process 15,000 pounds of potatoes per hour.

The invention is not limited in application to a screw type of blancher, but it may also be utilized with other types of apparatus, as for example, a reel type of blancher. The latter piece of equipment has a perforated elongated cylinder with an internal screw or auger running the entire length thereof. The cylinder is immersed either partially or wholly in a tank filled with water or other heat-exchanging liquid and is rotated therein, the product being fed into one end of the cylinder by various means and being transported therethrough by the rotary screw action.

In prior art apparatus of this type, the product is discharged by lifting it by a mechanical Ferris wheel. Using the present invention, the mechanical Ferris wheel is replaced by a vertical discharge flue in communication with an opening in the bottom of the end wall of the cylindrical casing so that the product is lifted to the point of discharge hydraulically instead of mechanically. Damage to the product is thus avoided and, of course, discharge is possible at or above the product inlet level.

In the foregoing description, the invention has been described with reference to certain particular preferred embodiments although it is to be understood that the specific details shown are merely illustrative and that the invention may be carried out in other ways without departing from the true spirit and scope of the following appended claims.

We claim:

1. Apparatus for processing edible foodstuffs comprising a horizontally disposed cylindrical casing having a plurality of orifices spaced longitudinally along the bottom thereof;

means to introduce a food product into one end of said cylindrical casing;

screw means coaxially disposed within said casing for transporting said food products from said one end of said casing to a point adjacent the other end of said casing;

said casing having an end wall at said other end thereof;

said end wall being provided with a discharge opening therein at the bottom of said casing;

means continuously to introduce a product-treating liquid into said casing through said orifices in an amount sufficient to maintain the level of liquid in said casing at a predetermined level above said screw means and to entrain said food product and carry it through said discharge opening;

a vertical discharge flue in communication with said discharge opening for receiving liquid and entrained product discharging therethrough;

and weir means at the top of said flue at a level substantially equal to said predetermined level and over which said liquid and entrained product flows.

2. Apparatus as described in claim 1, further comprising means adjacent said weir means to separate said product from said entraining liquid.

3. Apparatus as described in claim 2, further comprising means to collect said product-separated liquid and recirculate it to said liquid introducing means.

4. Apparatus as described in claim 3, further comprising a heat exchanger in communication with said collecting and recirculating means for exchanging heat with said product-separated liquid to restore said liquid to a given temperature.

5. Apparatus as described in claim 1 in which said liquid introducing means comprises pipe means disposed adjacent said bottom of said casing, said pipe means being in communication with said orifices and being adapted to introduce said product treating liquid upwardly through said orifices into said casing.

6. Apparatus as described in claim 1, further comprising means to inject a plurality of jets of fluid upwardly into the bottom of said vertical discharge flue to lift said liquid flowing therethrough over said weir means.

7. Apparatus as described in claim 6 in which said fluid-injecting means comprise means to inject a plurality of jets of air into said bottom of said discharge flue.

* * * * *